F. L. GORMLEY.
SAFETY LOCK FOR LIFTING JACKS.
APPLICATION FILED NOV. 19, 1919.
1,368,793.
Patented Feb. 15, 1921.
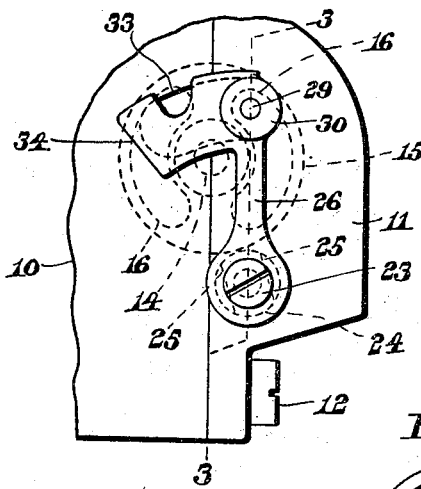
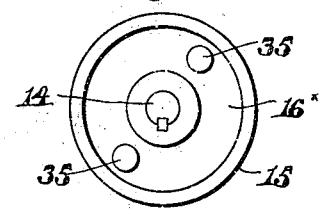
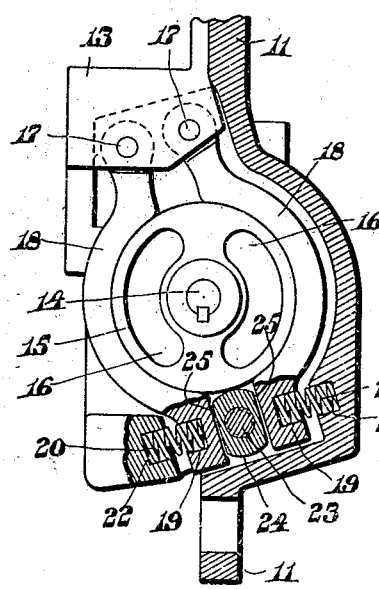
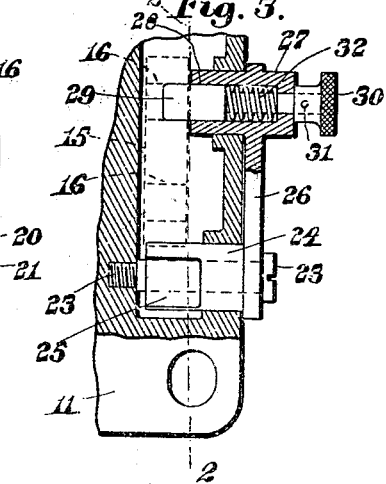
Inventor:
Frank L. Gormley
by Walter E. Lombard,
Atty.

UNITED STATES PATENT OFFICE.

FRANK L. GORMLEY, OF BROOKLINE, MASSACHUSETTS, ASSIGNOR TO A. O. NORTON, INC., OF BOSTON, MASSACHUSETTS, A CORPORATION OF MAINE.

SAFETY-LOCK FOR LIFTING-JACKS.

1,368,793.  Specification of Letters Patent.  Patented Feb. 15, 1921.

Application filed November 19, 1919. Serial No. 339,186.

*To all whom it may concern:*

Be it known that I, FRANK L. GORMLEY, a citizen of the United States of America, and a resident of Brookline, in the county of Norfolk and Commonwealth of Massachusetts, have invented certain new and useful Improvements in Safety-Locks for Lifting-Jacks, of which the following is a specification.

This invention relates to safety locks for lifting jacks which are provided with means whereby the jack may be automatically lowered by the weight of the load.

In jacks of this character, it often happens that under excessive loads the brake members coacting with the brake wheel, will be insufficient to retard the rotation of the brake shaft especially when considerable momentum has been imparted to said brake wheel.

As a consequence, it is desirable to provide a positive lock which will effectually prevent the rotation of the brake shaft in case the brake members should fail to operate for any reason.

The present invention consists in providing the brake wheel with one or more sockets in the face thereof with which, under abnormal conditions, a spring-pressed pin is adapted to engage before the brake wheel has made a complete revolution thereby locking it from further rotation.

The invention further consists in certain novel features of construction and arrangement of parts which will be thoroughly understood by reference to the description of the drawings and to the claims to be hereinafter given.

The present invention is an improvement upon another invention of mine shown and described in application Serial No. 312,818, filed on July 23, 1919.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents an elevation of a portion of the frame of a lifting jack and showing the arm for controlling the braking device.

Fig. 2 represents a vertical section of the same on line 2, 2, Fig. 3 showing the brake wheel in elevation and other parts in part section.

Fig. 3 represents a section on line 3, 3, on Fig. 1 and showing the operating arm partly in elevation and partly in section, and Fig. 4 represents a modified form of brake wheel.

Similar characters indicate like parts throughout the several figures of the drawings.

In the drawings, 10 is a portion of the framework of a lifting jack such as is disclosed in the application above referred to on which the present invention is an improvement.

A cover plate 11 is secured to this framework 10 by means of screws or other similar members 12.

To the rear face of the cover plate 11 is secured a bracket 13 in which is revolubly mounted a shaft 14 having a brake wheel 15 secured thereto. This brake wheel 15 has elongated sockets or openings 16 extending therethrough, said sockets or openings 16 being diametrically disposed therein.

The bracket 13 has also pivoted thereto at 17, 17, the curved brake members 18, 18, which are adapted to contact with the periphery of the brake wheel 15 and retard the rotation thereof to prevent the jack lowering too rapidly under an excessive load.

The lower face of the brake members 18 have sockets 19 formed therein in which are positioned the inner ends of springs 20, the outer ends of which are positioned respectively in sockets 21 in the cover plate 11 and 22 in the bracket 13.

These springs 20 normally retain the brake members 18 in frictional contact with the periphery of the brake wheel 15.

A headed screw or bolt 23 is also mounted in the cover plate 11 as indicated in Fig. 3 of the drawings, and mounted upon the unthreaded portion of the screw or bolt 23 is a cylindrical hub 24 having oppositely disposed flattened sides 25 on the inner end thereof.

These flattened sides 25 are normally parallel with the inner faces of the lower ends of the brake members 18.

The hub 24 has an arm 26 extending radially therefrom, the outer end of which is provided with a hub 27 having formed therein a socket 28 in which is mounted a cylindrical pin 29, the diameter of which is less than the width of the sockets or openings 16 in the brake wheel 15.

A milled head 30 is secured to the outer end of the reduced shank of the pin 29 by means of the member 31.

Within the socket 28 and surrounding the reduced shank of the pin 29 is a spring 32 which normally forces the pin 29 outwardly.

The inner end of the hub 27 extends through a curved slot 33 formed in the side walls of the framework 10 and the cover plate 11.

The arm 26 is provided with a lateral extension 34 which covers the slot 33 when said arm 26 is in its normal position as indicated in Fig. 1 of the drawings. This plate prevents dirt from passing through the slot 33 when the jack is not in use.

The spring 32 is considerably lighter than the springs 20 and as a consequence, these springs 20 forcing the lower ends of the brake members 18 into contact with the flattened faces 25 of the hub 24, normally retain the hub 27 of the arm 26 at the right hand end of the slot 33 with its axis in alinement with the path of movement of the sockets 16.

This permits the locking pin 29 to be forced into one of the sockets or openings 16 by means of the spring 32 thus effectually preventing the operation of the jack.

When it is desired to lower the load, the operator seizes the milled head 30 and withdraws the locking pin 29 from the socket 16 and moves the arm 26 about its axis until the locking pin 29 is at the opposite end of the slot 33 and out of register with the path of movement of the sockets 16 as the brake wheel 15 revolves.

This movement of the arm 26 removes the brake members 18 from contact with the wheel 15 and permits the jack to lower.

During the lowering of the jack, it is essential that the operator retain his hold upon the head 30 and keep the locking pin 29 within the socket 28 and out of register with the path of movement of the sockets or openings 16.

Should the operator remove his hand, for any reason, from the head 30, the spring 32 would immediately force the inner end of the pin 29 into contact with the outer face of the brake wheel 15 and the springs 20 acting upon the flat faces 25 of the hub 24 will immediately return the arm 26 to its normal position as indicated in Fig. 1 of the drawings, with the axis of the pin 29 in the path of movement of the sockets 16.

As a result, as soon as either of the sockets 16 reaches the point opposite to the pin 29, the spring 32 will force the pin 29 into said socket 16, thus positively and automatically locking the brake wheel 15 from further rotation as soon as the end wall of the socket 16 contacts with said pin.

Instead of forming two sockets 16 in the brake wheel 15, as shown in Fig. 2, a modified form of brake wheel may be used with an annular continuous groove $16^x$ in one face in which are positioned two diametrically disposed stop pins 35 which are adapted to engage with the locking pin 29 to prevent rotation of the brake wheel 15.

This construction makes the self-lowering jack positively "fool-proof" for as soon as the operator ceases to retain his grasp upon the head 30, the various instrumentalities of the device will automatically operate forcing the locking pin into the first socket $16^x$ which reaches a point in register with said pin during the rotation of the brake wheel.

In other words, owing to the sockets 16 being diametrically disposed, the brake wheel 15 cannot rotate after the pin 29 has been released more than a half revolution before said pin will enter a socket 16 and prevent further lowering of the load.

With this device upon a self-lowering jack, all accidents are effectually prevented during the lowering operation.

It is believed that the operation and many advantages of the invention will be readily understood without further description.

Having thus described my invention, I claim:

1. In a device of the class described, a revoluble brake wheel; a brake member normally coacting therewith; a cam for removing said member from said wheel; an arm for actuating said cam; and means carried by said arm adapted to coact with said wheel and positively lock the wheel from rotation.

2. In a device of the class described, a revoluble brake wheel having a socket in one face; a brake member normally coacting therewith; a cam for removing said member from said wheel; an arm for actuating said cam; and a spring-pressed pin carried by said arm adapted to coact with the socket in said wheel and positively lock the wheel from rotation.

3. In a device of the class described, a revoluble brake wheel for a lifting jack having a socket in one face; a spring-pressed brake member adapted to coact with the periphery of said wheel; an oscillating cam adapted to remove said member from said wheel; an arm for actuating said cam provided with a hub extending through a slot in the frame of said jack; and a spring-pressed pin in said hub adapted to coact with said socket to prevent the rotation of said brake wheel.

4. In a device of the class described, a revoluble brake wheel for a lifting jack having a socket in one face; a brake member adapted to coact with the periphery of said wheel; an oscillating cam adapted to remove said member from said wheel; an arm for actuating said cam provided with a hub extending through a slot in the frame of said jack; a spring-pressed pin in said hub adapted to coact with said socket to prevent the rotation of said brake wheel; and resilient means coacting with said brake member and normally retaining said hub at one end of said slot with its axis registering with the path of movement of said socket and forcing said brake member into contact with said wheel.

5. In a device of the class described, a revoluble brake wheel for a lifting jack having a socket in one face; a pivoted brake member adapted to coact with the periphery of said wheel; an oscillating arm having at its pivot a cam adapted to remove said member from said wheel and having a hub at its outer end extending through a curved slot in the framework of the jack; a spring-pressed locking pin in said hub adapted to enter said socket when the axis of said socket and pin are in register; and means coacting with said brake member for normally retaining said hub at one end of said slot and forcing said brake member into contact with said wheel.

6. In a device of the class described, a revoluble brake wheel for a lifting jack having a socket in one face; a pivoted brake member adapted to coact with the periphery of said wheel; an oscillating arm having at its pivot a cam adapted to remove said member from said wheel and having a hub at its outer end extending through a curved slot in the framework of the jack; a spring-pressed locking pin in said hub adapted to enter said socket when the axis of said socket and pin are in register; means for normally retaining said hub at one end of said slot; and a lateral extension to said arm adapted to cover said slot when said arm is in normal position.

7. In a device of the class described, a revoluble brake wheel having a stop shoulder in one face; a brake member normally coacting with said brake wheel; a cam for removing said member from said wheel; an arm for actuating said cam; and a pin carried by said arm adapted to be moved into the path of said stop shoulder.

8. In a device of the class described, a revoluble brake wheel having a stop shoulder in one face; a brake member normally coacting with said brake wheel; a cam for removing said member from said wheel; an arm for actuating said cam; and a spring-pressed pin carried by said arm adapted to be moved into the path of said stop shoulder.

Signed by me at 746–7 Old South Bldg., Boston, Mass., this 17th day of November, 1919.

FRANK L. GORMLEY.

Witnesses:
  WALTER E. LOMBARD,
  NATHAN C. LOMBARD.